June 21, 1938.  A. J. SCHOLTES  2,121,747
HOSE NOZZLE
Filed March 2, 1938
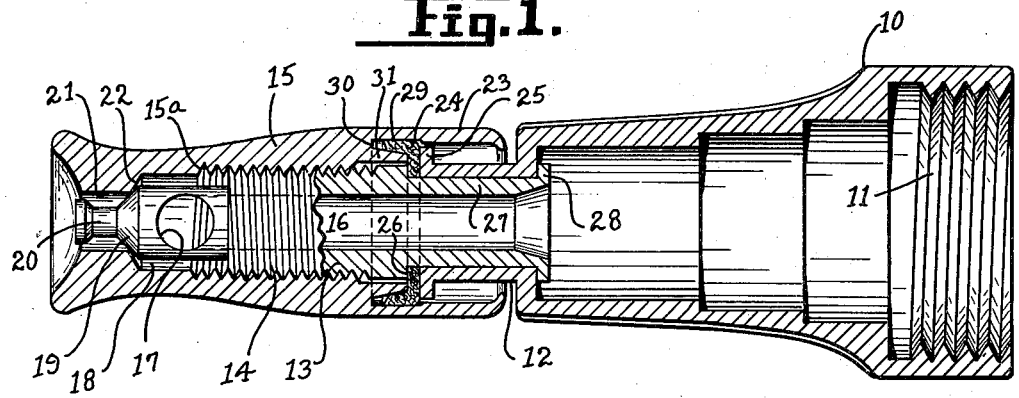
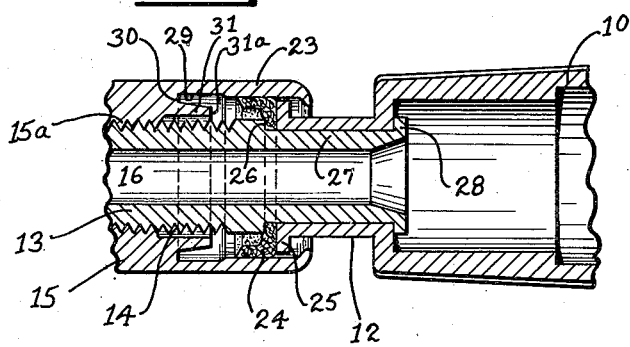
INVENTOR
Albert J. Scholtes
BY
H. F. Johnston
ATTORNEY Patented June 21, 1938

2,121,747

UNITED STATES PATENT OFFICE 2,121,747

HOSE NOZZLE

Albert J. Scholtes, Biloxi, Miss., assignor to Scovill Manufacturing Company, Waterbury, Conn., a corporation of Connecticut Application March 2, 1938, Serial No. 193,495

7 Claims. (Cl. 299—131)

This invention relates to certain improvements in hose nozzles having to do particularly with the sealing element of the device.

This invention is an improvement of a hose nozzle disclosed in a co-pending application in the name of Albert C. Lusher et al., filed April 3, 1937, Serial No. 134,779, showing a somewhat similar sealing element.

The principal object of this invention is to produce a hose nozzle having an improved and effective sealing construction between the adjustable members of the nozzle to prevent any leakage. To this end a leather cupped washer is employed between the relative rotative members, and its cupped wall is adapted to be expanded or forced outwardly each time the nozzle is brought to closed position for the purpose of keeping the cupped washer from collapsing if allowed to dry out or for other reasons.

The above and other objects are attained by a construction illustrated in the accompanying drawing, in which:—

Fig. 1 is a longitudinal sectional view of the hose nozzle embodying the principles of the invention and showing the adjustable nozzle end in its closed shut-off position.

Fig. 2 is a fragmentary view on the same section showing the relation of the parts when the nozzle is in open or operating position.

Referring now in detail to the drawing, the numeral 10 designates generally the hollow body member of the device having its enlarged rear end provided with an internal thread 11 for attachment to the conventional threaded member usually found on the end of a hose. The forward end of the body member 10 is provided with a projecting reduced cylindrical hollow neck 12 to which is attached a hollow stem member 13 in a manner to be more specifically described later. The intermediate portion of the stem member 13 is provided with an enlarged threaded section 14 capacitated to adjustably receive the threaded section 15a of an adjustable nozzle end 15.

The central hollow portion of the stem member 13 defines a suitable liquid conduit 16, the forward end of which is intercepted by a transverse opening 17 leading into a cylindrical chamber 18 formed at the interior intermediate portion of the adjustable nozzle end 15 ahead of the threaded section 15a. The end of the stem ahead of the transverse opening 17 is constructed with a conic section 19, which terminates in a projecting integral spray disseminating pin 20.

The cylindrical chamber 18 leads into a restricted discharge orifice 21 by the connection of an intermediate conic section 22. The latter section 22 is capacitated to engage the conic section 19 of the stem member 13 when the device is in closed position to effect a tight seal therebetween. Otherwise, the head end of the nozzle device is formed in the well known manner of conventional hose nozzles and forms no part of the present invention.

In order to provide for a liquid tight seal between the relative movable sections of the nozzle, the adjustable nozzle end 15 is constructed with a rearwardly extending cylindrical sleeve portion 23, which normally surrounds the reduced cylindrical neck 12 of the body member 10 in spaced relation thereto. A fibrous cupped washer 24 is carried by the interior stem member 13 and coacts with sleeve portion 23 of the nozzle end 15 in producing an efficient leak-proof seal. As a means for securing the washer 24 in place, the forward end of the cylindrical sleeve neck 12 is provided with an integral flanged seat 25, and a shoulder 26 is provided between the enlarged threaded section 14 and the smaller shank portion 27 of the stem 13. The shank 27 is adapted to have an axial forced fit into the sleeve neck 12, and concurrent with the assembly thereof, the base portion of the cupped washer 24 is adapted to be clamped between the flanged seat 26 and the shoulder 27 and be rigidly secured thereto. With the washer 24 and parts assembled in the above manner, the inner end of the shank 27 may be upset outwardly as at 28 against the interior wall of the hollow body 10 to effect a permanent assembly.

As an assurance that the cupped wall of the washer 24 will always retain its normal shape, the interior wall of the surrounding sleeve portion 23 is provided with a slightly enlarged groove 29 adjacent its base end 30, and formed integral with the base end 30 is a depending concentric annular skirt 31 projecting a substantial distance into the hollow portion of said sleeve 23. The outer wall of this skirt 31 is beveled, as shown in the drawing, and terminates with a flat base end 31a. Each time that the nozzle end 15 is threaded to closed position, the beveled wall of the skirt member 31 is adapted to engage against the adjacent inner surface of the cupped washer 24 and causes the cupped wall of said washer 24 to be stretched or expanded outwardly into the enlargement 29.

By the above action, there is an assurance that the walls of the cupped washer can be reformed to their natural shape in case they become mutilated or collapsed without the necessity of having to have direct access thereto. In addition, the fact that the cupped wall of the washer 24 is slightly stretched each time the nozzle is closed when the nozzle is subsequently opened, the wall of said washer 24 will have a tighter bearing against the inner wall of smaller diameter of the sleeve 23 during that time that the nozzle is in an operating state.

When the nozzle is in a closed state, it is to be noted that besides having the cupped wall of the washer 24 pressed outwardly into the enlarged groove 29, the flat end 31a of the skirt 31 is also caused to engage and compress the base portion of said washer tightly against the supporting flange 25. Thus, there are two angularly directed forces simultaneously engaging the washer during the nozzle shut-off position to prevent back leakage. It is to be understood that the relative position of the skirt 31 is such as to cooperate with the washer 24 to effect the desired back-leakage seal without affecting the junction of the beveled faces 19 and 22 to coact as a valve and seal the forward end of the nozzle.

While only one form is shown and illustrated in this application, it will be understood that other changes and variations may be made without departing from the scope of the invention, as defined in the appended claims.

What is claimed is:

1. In a hose nozzle, a body member, a stem member carried by said body member, a nozzle end having axial adjustable engagement with said stem member, said nozzle end having a sleeve section surrounding and in spaced relation to the connecting portions of said body and stem members, a pliable sealing element engaged between said members and said sleeve, and means carried by said nozzle end for forcing said washer outwardly against the adjacent wall of said sleeve section each time the nozzle is adjusted to closed position.

2. In a hose nozzle, a body member having a tubular shank terminating its inner end with a seating flange, a stem member attached to said shank, a nozzle end having axial adjustable engagement with said stem member, said nozzle end having a sleeve section surrounding and in spaced relation to the connecting portions of said body and stem members, a pliable seating element surrounding said stem member and seated against said flange, and means forming a part of said nozzle capacitated to compress said sealing element between said flange and itself each time the nozzle is adjusted to closed position.

3. In a hose nozzle, a body member, a stem member, a pair of opposed shoulders formed on said body and stem members respectively, a nozzle end having axial adjustable engagement with said stem member, a sleeve section forming a part of said nozzle end and disposed in spaced relation to the connecting portions of said body and stem members, a pliable cupped washer having its base portion clamped between said opposed shoulders and its flanged wall frictionally engaging with the interior wall of said sleeve, and means within said nozzle end for jamming the flanged wall of said washer against the wall of said sleeve whenever the nozzle is adjusted to a closed position.

4. In a hose nozzle, a body member, a stem member, a pair of opposed shoulders formed on said body and stem members respectively, a nozzle end having axial adjustable engagement with said stem member, a sleeve section forming a part of said nozzle end and disposed in spaced relation to the connecting portion of said body and stem members, an interior transverse ledge provided at the juncture of said sleeve with said nozzle end, said sleeve section having an enlargement formed in its inner wall adjacent the transverse ledge, a pliable cupped washer having its base portion clamped between said opposed shoulders and its flanged wall frictionally engaging with the interior wall of said sleeve as a leak-proof seal, and an annular skirt member projecting from said transverse ledge and serving to force the flanged wall of said washer outwardly into said enlargement coincident with the closing operation of said nozzle.

5. In a hose nozzle, comprising a hollow spindle having an intermediate radial flanged seat, an adjustable nozzle end having axial adjustable threaded engagement with said spindle and provided with a cylindrical sleeve portion disposed in spaced relation to said spindle, a pliable cupped washer carried by said spindle and seated against said flange seat, and an annular wedging means attached to said nozzle end and serving to force the cupped wall of said washer outwardly against the surrounding sleeve portion each time the nozzle end is adjusted to closed position.

6. In a hose nozzle, comprising a hollow spindle having an intermediate radial flanged seat, an adjustable nozzle end having axial adjustable threaded engagement with said spindle and provided with a cylindrical sleeve portion disposed in spaced relation to the intermediate portion of said spindle, a pliable cupped washer carried by said stem and seated against said flange seat, and a concentric annular skirt carried by said nozzle end and projecting into the hollow confines of said sleeve portion, said skirt having its outer wall beveled and its end terminating in a flat face, which beveled wall and flat face are adapted respectively to wedge the cupped wall of said washer against the surrounding wall of said sleeve portion and to compress the base of said washer against said flanged seat.

7. In a hose nozzle, comprising a hollow spindle having an enlarged coupling at one end, a valve at its opposite end and an intermediate radial flanged section, an adjustable nozzle end having threaded engagement with said spindle and provided with a valve seat and a cylindrical sleeve portion disposed in spaced relation to said spindle, a pliable cupped washer carried by said spindle and seated against said flanged section, and an annular wedging means attached to said nozzle end, the relative position of the valve seat and said wedging means being such that said valve is brought to closed position and simultaneously the wedging means is caused to expand the cupped wall and compress the base of said washer tightly against the surrounding sleeve portion and flanged section respectively as a liquid-proof seal upon adjusting the nozzle to closed position.

ALBERT J. SCHOLTES.